United States Patent
Scharbert et al.

Patent Number: 6,022,986
Date of Patent: Feb. 8, 2000

[54] MANGANIFEROUS POLYOXOMETALLATES, SYNTHESIS AND USE THEREOF

[75] Inventors: Bernd Scharbert; Rolf Peter Schulz, both of Frankfurt; Bernt Krebs, Münster; Rainer Böhner, Norden; Christian Thülig, Ahlen, all of Germany

[73] Assignee: Hoechst Research & Technology Deutschland GmbH & Co. KG, Frankfurt, Germany

[21] Appl. No.: 09/011,986

[22] PCT Filed: Aug. 20, 1996

[86] PCT No.: PCT/EP96/03669

§ 371 Date: Apr. 23, 1998

§ 102(e) Date: Apr. 23, 1998

[87] PCT Pub. No.: WO97/07886

PCT Pub. Date: Mar. 6, 1997

[30] Foreign Application Priority Data

Aug. 22, 1995 [DE] Germany .................. 195 30 787

[51] Int. Cl.[7] .................................................. C07F 15/00
[52] U.S. Cl. .................. 556/28; 556/14; 502/168; 502/170; 502/215; 502/219; 502/305; 502/324
[58] Field of Search .................. 556/14, 28; 502/215, 502/219, 305, 324, 168, 170

[56] References Cited

U.S. PATENT DOCUMENTS

| | | | |
|---|---|---|---|
| 4,864,041 | 9/1989 | Hill | 549/513 |
| 5,681,973 | 10/1997 | Hoelderich et al. | 556/26 |
| 5,928,382 | 7/1999 | Reinhardt et al. | 8/111 |

FOREIGN PATENT DOCUMENTS

| | | |
|---|---|---|
| 0353722 A2 | 2/1990 | European Pat. Off. |
| 0466471 A1 | 1/1992 | European Pat. Off. |
| WO 87/01615 | 3/1987 | WIPO |

*Primary Examiner*—Porfirio Nazario-Gonzales
*Attorney, Agent, or Firm*—Frommer Lawrence & Haug LLP

[57] ABSTRACT

The invention is directed to manganese-containing polyoxometallates of the formula (1)

$$(Q)_q(Mn_pA_aX_xY_yM_mO_dZ_z(H_2O)_b)cH_2O \quad (1)$$

where Q is one or more cations selected from the group consisting of H, Li, K, Na, Rb, Cs, Ca, Mg, Sr, Ba, Al, $PR^1R^2R^3R^4$ and $NR^1R^2R^3R^4$ where $R^1$, $R^2$, $R^3$ and $R^4$=H or $C_1$–$C_{20}$-alkyl, $C_5$–$C_8$-cycloalkyl or aryl;

Mn is manganese;

A is a heterometal and is one or more transition metals from transition groups II to VIII apart from Zn, in particular Ru, V, Ti, Zr, Cr, Fe, Co, Cu, Sn, Ni, Re or Os;

X is one or more elements selected from the group consisting of Ga, B, P, Si, Ge, As, F, Cl, Br and I;

Y is Sb, S, Te, Se and Bi;

M is one or more transition metals selected from the group consisting of Mo, W, Nb, Ta and V;

Z is one or more anions selected from the group consisting of $OH^-$, $F^-$, $Cl^-$, $Br^-$, $I^-$, $N_3^-$, $NO_3^-$, $ClO_4^-$, $NCS^-$, $SCN^-$, $PF_6^-$, $RSO_3^-$, $RSO_4^-$, $CF_3SO_3^-$, $BR_4^-$, $BF_4^-$, $OAc^-$, where R=H, $C_1$–$C_{20}$-alkyl, $C_5$–$C_8$-cycloalkyl or aryl. The indexes q, p, a, x, y, m, d, z and the numbers b and c are defined in the specification. The oxidation catalyst according to the invention is particularly effective in activating peroxidic compounds and oxygen.

9 Claims, No Drawings

MANGANIFEROUS POLYOXOMETALLATES, SYNTHESIS AND USE THEREOF

The present invention describes the preparation of novel manganese-containing heteropolyoxometallates.

Polyoxometallates are inorganic metal-oxygen clusters comprising defined oligomeric or polymeric structural units and are formed spontaneously under suitable conditions from simple vanadium, niobium, tantalum, molybdenum or tungsten compounds in aqueous medium or in organic solvents (M. T. Pope, Heteropoly and Isopoly Oxometalates, Springer-Verlag Berlin, 1983).

Isopolyoxometallates are the simplest form of polyoxometallates and can be described as binary oxide anions $[M_mO_y]^{p-}$. Typical examples are $[Mo_2O_7]^{2-}$ (m=2), $[Mo_6O_{19}]^{2-}$ (m=6), $[W_6O_{24}]^{12-}$ (m=6), $[Mo_{36}O_{112}]^{8-}$ (m=36). Polyoxometallates having the formula $[X^*_xA_aM_mO_y]^{p-}$ contain one or more heteroatoms. These heteroatoms can be nonmetals, semimetals and/or even metals. $X^*$ is, for example, phosphorus in $[PW_{12}O_{40}]^{3-}$, a classical anion of the Keggin structural type. Formal replacement of $MO_y$ structural units by heteroatoms makes it possible to introduce redox-active transition metal ions into the solid state structure.

Manganese-containing polyoxometallates are known. Among the lacuna structures, a distinction is made between, for example, Keggin anions $[MnXM_{11}O_{39}]^{5-}$ and anions of the Dawson structural type $[MnX_2M_{17}O_{61}]^{7-/8-}$ (J. Am. Chem. Soc. 109, 1987, 402 and J. Inorg. Nucl. Chem. 32, 1970, 3875) where M=Mo, W and X=P, Si, Ge and B. Within this class of compounds, the compounds $K_5[PMnW_{11}O_{39}]$ and $K_7[BMnW_{11}O_{39}]$ have been studied as catalysts for the epoxidation of olefins (J. Am. Chem. Soc. 117, 1995, 685). However, the catalytic activity of the manganese-containing polyoxometallates is very low compared to the unsubstituted free acid $H_3[PW_{12}O_{40}]$ or is virtually undetectable.

The compounds $K_6[PW_{11}MnN_3O_{39}]$ and $K_6[SiMo_{11}MnO_{39}]$ are used as catalysts for the liquid-phase oxidation of alkanes, but the second of these displays virtually no catalytic activity. Here, catalytic activities are achieved virtually only when vanadium and/or azide are present as promoters (EP-A-301 723, Table I).

Manganese-containing heteropolyoxometallates containing the heteroatoms X=S, Sb, Te, Bi and Se have not been known hitherto.

Only manganese-containing heteropolyoxometallates, i.e. manganese-heteropolyoxometallates without a further heteroatom, are known in only a few cases. Gazz. Chim. Ital. 98, 1968, 1197 mentions a heteropolyoxometallate containing divalent manganese as ammonium salt of the $[MnMo_6O_{18}(OH)_6]^{4-}$ anion. No information is given about the properties of this compound or about the possibility of introducing manganese in higher oxidation states.

The potassium and ammonium salts of a heteropolyoxometallate containing tetravalent manganese, viz. $[MnMo9O_{32}]^{6-}$ anion, have been described [J. Less-Common Metals 54, 1977, 289 and Acta Cryst. 7, 1954, 438]. This anion is obtained by oxidation of an aqueous Mn(II) salt solution with paramolybdate. The preparation of a sodium/potassium salt of the anion $(MnW_6O_{24})^{8-}$ containing tetravalent manganese by reaction of sodium tungstate and manganese(II) sulfate with potassium peroxodisulfate in aqueous solution without addition of acid is described in Sov. J. Coord. Chem. 5. 1979, 740. In this case too, no information is given as to how a change in the oxidation state of the manganese can be achieved; in particular, a compound containing trivalent manganese is not known.

Polyoxometallates which are doped with not only manganese but also with a further transition metal zinc or cobalt are known from J. Am. Chem. Soc. 116, 1994, 5509. The compound $[WZnMn_2(ZnW_9O_{34})_2]^{12-}$ is used as catalyst for the epoxidation of olefins with $H_2O_2$ (J. Am. Chem. Soc. 117, 1995, 5066). This reaction is carried out in a two-phase system comprising water and toxic 1,2-dichloroethane. The corresponding cobalt compound $[WCoMn_2(CoW_9O_{34})_2]^{12-}$ is inactive. The catalytic activity therefore appears to indicate a cooperative effect of zinc and manganese.

Catalytically active manganese-containing polyoxometallates of the formula (1) are not known. There is no indication in the prior art that polyoxometallates are suitable for use in laundry detergents and cleaners and can, even in catalytic amounts, increase the effectiveness of bleaching systems such as hydrogen peroxide or peracetic acid. Furthermore, the literature does not teach the use of polyoxometallates in combination with other peroxidic compounds.

It is therefore an object of the present invention to provide novel manganese-containing oxidation catalysts which selectively catalyze the oxidation reactions, for example epoxidations, and also increase the effectiveness of bleaching systems.

It has now surprisingly been found that manganese-containing polyoxometallates of the formula (1) possess these properties.

The present invention accordingly provides novel catalytically active manganese-containing polyoxometallates of the formula (1)

$$(Q)_q(Mn_pA_aX_xY_yM_mO_dZ_z(H_2O)_b)cH_2O \quad (1)$$

where the symbols Q, A, X, Y, M, Z, q, p, a, b, x, y, m, d, z and c have the following meanings:

Q is one or more cations selected from the group consisting of H, Li, K, Na, Rb, Cs, Ca, Mg, Sr, Ba, Al, $PR^1R^2R^3R^4$ and $NR^1R^2R^3R^4$ where $R^1$, $R^2$, $R^3$ and $R^4$=H or $C_1$–$C_{20}$-alkyl, $C_5$–$C_8$-cycloalkyl or aryl, preferably H, Li, K, Na, Rb, Cs and $NR^1R^2R^3R^4$;

the index q is in the range from 1 to 60, in particular in the range from 1 to 40, and, for monovalent countercations, at the same time indicates the charge of the anionic unit;

Mn is manganese in the oxidation state II, III, IV, V, VI or VII, preferably in the oxidation state II, III or IV;

the index p is in the range from 0.1 to 10, in particular in the range from 0.1 to 8;

A is a heterometal and is one or more transition metals from transition groups II to VIII apart from Zn, in particular Ru, V, Ti, Zr, Cr, Fe, Co, Cu, Sn, Ni, Re or Os, preferably Ru, V, Ti, Fe, Cu, Re and Os;

the index a is in the range from 0 to 10, in particular in the range from 0 to 5;

X is one or more elements selected from the group consisting of Ga, B, P, Si, Ge, As, F, Cl, Br and I;

the index x is in the range from 0 to 10, in particular in the range from 0 to 5;

Y is Sb, S, Te, Se and Bi;

the index y is in the range from 0.1 to 10;

M is one or more transition metals selected from the group consisting of Mo, W, Nb, Ta and V, in particular Mo, W and V;

the index m is in the range from 0.5 to 60, in particular in the range from 1 to 40;

Z is one or more anions selected from the group consisting of OH⁻, F⁻, Cl⁻, Br⁻, I⁻, $N_3^-$, $NO_3^-$, $ClO_4^-$, NCS—, SCN—, $PF_6^-$, $RSO_3^-$, $RSO_4^-$, $CF_3SO_3^-$, $BR_4^-$, $BF_4^-$, OAc⁻, where R=H, $C_1$–$C_{20}$-alkyl, $C_5$–$C_8$-cycloalkyl or aryl; the index z is in the range from 0 to 10, in particular in the range from 0 to 8;

the index d is the number of oxygen atoms necessary to balance the charge and b and c are numbers in the range from 0 to 50.

Furthermore, the present invention provides a process for preparing catalytically active compounds of the formula (2)

$$(Q)_q(Mn_pA_aX_xY_y \cdot M_mO_dZ_z(H_2O)_b)cH_2O \quad (2)$$

where the symbols Q, A, X, Y, M, Z, q, p, a, x, m, z, d, b and c are as defined above and y* is a number in the range from 0 to 10, by reacting manganese compounds which are soluble in aqueous or organic medium with soluble compounds of the component M in the presence of compounds of the formula (3)

$$H_hX_x \cdot Y_yZ_zO_o.$$

where

H is hydrogen and the index h is in the range from 0 to 8;

X is one or more elements selected from the group consisting of Ga, B, P, Si, Ge, As, F, Cl, Br and I and the index x* is in the range from 0 to 10;

Y is Sb, S, Se, Te or Bi and the index y is in the range from 0.1 to 10;

Z is one or more anions selected from the group consisting of OH⁻, F⁻, Cl⁻, Br⁻, I⁻, $N_3^-$, $NO_3^-$, $ClO_4^-$, NCS—, SCN—, $PF_6^-$, $RSO_3^-$, $RSO_4^-$, $CF_3SO_3^-$, $BR_4^-$, $BF_4^-$, OAc⁻ where R=H, $C_1$–$C_{20}$-alkyl, $C_5$–$C_8$-cycloalkyl or aryl and the index z* is in the range from 0 to 10 and the index d* is the number of oxygen atoms necessary to balance the charge.

Compounds of the formulae (1) and (2) are suitable for use as oxidation catalysts, in particular as catalysts for increasing the effectiveness of bleaching systems, for example of hydrogen peroxide or other peroxidic compounds such as inorganic and organic peracids or their salts, and can thus be used in the production of laundry detergents and cleaners and also in the delignification of paper.

Examples of catalytically active compounds of the formulae (1) and (2) are:

$(Na)_7[MnMo_9O_{32}]$*
$(K)_7[MnMo_9O_{32}]$*
$(NH_4)_{10}[Mn_3Sb_2W_{19}O_{68}]$*
$Na_{17}[Mn_2Se_6W_{24}O_{94}Cl]$*
$Na_2(NMe_4)_2[Mn_2W_{12}O_{40}(OH)_2]12H_2O$
$(Na/K)_{10}[Mn_3Se_2W_{18}O_{66}]$*
$Na_8[MnW_{12}O_{40}(OH)_2]6H_2O$
$Na_6[MnW_{12}O_{40}(OH)_2]6H_2O$
*=contains water of crystallization Suitable starting compounds are salts or compounds of manganese which are soluble in aqueous or organic medium.

Examples are: manganese(II) salts:

e.g. $Mn(OAc)_2 4H_2O$ (OAc=acetate), $MnBr_2$, $MnBr_2 4H_2O$, $MnCO_3 nH_2O$, $MnCl_2$, $MnCl_2 4H_2O$, $MnI_2$, $Mn(NO_3)_2 4H_2O$, MnO, $Mn(ClO_4)_2 6H_2O$, $MnSO_4 H_2O$;

manganese(III) salts:
e.g. $Mn(OAc)_3 2H_2O$;

or manganese(VII) salts:
e.g. $KMnO_4$.

The compounds of the invention are synthesized by reacting the individual starting components in aqueous or organic solutions (e.g. in $CH_2Cl_2$, $CH_3OH$, $CH_3CN$, etc.).

The M component of the polyoxometallate is usually introduced via water-soluble M—O compounds such as molybdates, tungstates, vanadates. Here, commercial starting materials such as $Na_2MoO_4 2H_2O$, $(NH_4)_2MoO_4$, $(NH_4)_6Mo_7O_{24}$, $Na_2WO_4 2H_2O$, paratungstate, decavanadate or similar compounds are usually employed.

The M component is reacted in solution together with soluble salts of manganese and, if desired, further transition metal salts. Various transition metal salts can also be combined.

The component Y is added in the form of compounds of the formula (3) $H_hX_{x^*}Y_yZ_{z^*}O_{d^*}$.

Examples are the corresponding acids (e.g. $H_2SeO_3$, $H_2SeO_4$, $H_2SO_3$, $H_2SO_4$) or salts (e.g. selenates, sulfates, antimonates, tellurates or bismuthates) or the oxides (e.g. $SeO_2$, $Sb_2O_3$, $TeO_2$, etc.). The component Y is preferably added in solution.

The component Y plays a special role in the synthesis of compounds of the formulae (1) and (2), since according to the process of the invention it is added in the form of compounds of the formula (3) but is often not incorporated into the heteropolyanion, i.e. y*=0, although y>0.

The addition of the component Y is of particular importance in the process of the invention, since without Y the synthesis of compounds of the formulae (1) and (2) does not succeed.

The course of the reaction is controlled via the pH. The pH is preferably in the range from 2 to 6. It can be set by means of a buffer system (e.g. sodium acetate/acetic acid, citric acid/citrate or citric acid/NaOH) or by precise addition of acids, preferably acids containing selenium, sulfur or phosphorus and hydrochloric acid, particularly preferably selenic acid, selenous acid, sulfuric acid, sulfurous acid, phosphoric acid and phosphorus acid, in the synthesis of the manganese-containing polyoxometallates, or organic and inorganic bases, preferably sodium carbonate, sodium hydrogen carbonate, sodium acetate or NaOH.

The course of the reaction can also be controlled by means of the temperatures and by varying the order of addition of the individual components and the precipitant.

The anion structure is found to be dependent on the order of addition of the individual components.

In this reaction, the temperature is preferably in the range from 20 to 100° C., in particular in the range from 20 to 80° C.

The reaction solution is stirred from 1 minute to 24 hours, preferably from 2 minutes to 6 hours. The target products are obtained by crystallizing out the compounds or by precipitating the products by addition of a precipitant, for example an alkali metal halide or an (alkyl)ammonium halide or by addition of an organic solvent such as methanol or ethanol.

A further possible way of synthesizing the manganese-containing polyoxometallates of the invention is to synthesize the corresponding polyanions directly in organic solvents. Preference is given to using dichloromethane, acetonitrile and methanol. Syntheses under an inert gas atmosphere (e.g. nitrogen, argon) and the use of dried solvents are also possible.

Surprisingly, the structure and the composition of the polyanion have been found to be dependent on the addition of the precipitate. Precipitation with ammonium chloride, for example, results in an anion containing tetravalent manganese (ESR signal) as ammonium salt. If potassium chloride or tetramethylammonium bromide are used for the precipitation, one obtains the catalytically active mixed Na/K salts, or the pure potassium salt, which lead to the hitherto unknown polyanion containing trivalent manganese (no ESR signal).

The compounds of the formulae (1) and (2) are suitable as oxidation catalysts in a wide variety of application areas, for example for the selective oxidation of organic compounds such as saturated and unsaturated hydrocarbons and also aromatics, in particular for use in the bleaching and delignification of paper and also for any oxidation reactions by activation of hydrogen peroxide or other peroxidic compounds as well as oxygen.

In particular, polyoxometallates of the formulae (1) and (2) are used in the production of laundry detergents to increase the effectiveness of hydrogen peroxide or other bleaching systems based on peroxidic compounds such as organic and inorganic peracids or their salts.

EXAMPLES

Example 1

$(NH_4)_{10}[Mn_3Sb_2W_{19}O_{68}]*bH_2O$ 50 g of sodium tungstate dihydrate are dissolved in 200 ml of water, and a solution of 2.5 g of antimony(III) oxide in 30 ml of concentrated hydrochloric acid is slowly added dropwise. The solution is subsequently admixed with 5 g of manganese(II) chloride tetrahydrate in 100 ml of water. The reaction mixture is brought to a pH of 7.5 by addition of sodium carbonate and is stirred for 10 minutes at 50° C. Orange crystals are precipitated by addition of 2 g of ammonium chloride in 20 ml of water. The composition is determined by single-crystal structure analysis.

Example 2

$Na_{17}[Mn_2Se_6W_{24}O_{94}Cl]bH_2O$ 50 g of sodium tungstate dihydrate, 4.5 g of selenic acid and 8 g of manganese(II) chloride tetrahydrate are dissolved in 500 ml of 1 normal buffer solution (acetic acid/sodium acetate). After stirring for 5 minutes at 25° C., the mixture is filtered and orange crystals are isolated from the filtrate after slow evaporation of the solvent. The composition is determined by means of single-crystal structure analysis.

Example 3

Polyoxotungstate Containing Mn and W 50 g of sodium tungstate dihydrate in 150 ml of water and 2.8 g of potassium permanganate in 100 ml of 1 normal hydrochloric acid are slowly added dropwise to a solution 4.9 g of sodium selenate in 100 ml of 1 normal buffer solution (acetic acid/sodium acetate). After stirring for one hour at 25° C., the mixture is allowed to stand at 0° C. until orange crystals can be isolated from the solution. The lattice constants are a=8.935, b=11.347, c=12.559 with a=1100, β=103.770 and g=104.090. Selenium is not present.

Example 4

Polyoxomolybdate Containing Mn and Se

A solution of 1.5 mmol of manganese(II) nitrate in 12 ml of 1 normal hydrochloric acid is added dropwise to a solution of 12 mmol of the salt $Na_2MoO_4$ and 1.5 mmol of selenous acid in 20 ml of water. After stirring for two hours at 25° C., a solution of 1.5 mmol of tetramethylammonium bromide is added. Allowing to stand at 0° C. gives 1.2 g of pale brown crystals which contain 59% of molybdenum, 1.8% of manganese and 0.1% of selenium.

Example 5

Polyoxotungstate Containing Mn, Se and W

A solution of 1.5 mmol of manganese(II) nitrate in 12 ml of 1 normal hydrochloric acid is added dropwise to a solution of 12 mmol of the salt $Na_2WO_4$ and 1.5 mmol of selenous acid in 20 ml of water. After stirring for two hours at 25° C., precipitation is carried out using an excess of solid potassium chloride, the precipitate obtained is filtered off and washed with saturated KCl solution. Drying under reduced pressure gives 3.2 g of a brown powder which contains 62% of tungsten, 1.8% of manganese and 0.1% of selenium.

Example 6

$Na_2(NMe_4)_2[Mn_2W_{12}O_{40}(OH)_2]12H_2O$

A solution of 1.5 mmol of manganese(II) nitrate in 12 ml of 1 normal hydrochloric acid is added dropwise to a solution of 12 mmol of the salt $Na_2WO_4$ and 1.5 mmol of selenous acid in 20 ml of water. After stirring for two hours at 25° C., a solution of 1.5 mmol of tetramethylammonium bromide is added. Allowing to stand at 0° C. gives 1.0 g of pale brown crystals. Elemental analysis indicated the composition $Na_2(NMe_4)_2[Mn_2W_{12}O_{40}(OH)_2]12H_2O$.

Example 7

Polyoxotungstate Containing Mn and Se

A solution of 7.5 mmol of manganese(II) nitrate and 7.5 mmol of manganese(III) acetate in 120 ml of 1 normal hydrochloric acid is added dropwise to a solution of 0.12 mol of sodium tungstate dihydrate and 15 mmol of selenic acid in 200 ml of water. After stirring for 2 hours at room temperature, an excess of solid cesium chloride (6.8 g) is added, the precipitate is filtered off after 24 hours and washed with saturated CsCl solution. Drying under reduced pressure gives 3.8 g of a brown powder.

Example 8

Polyoxotungstate Containing Mn and Se

A solution of 7.5 mmol of manganese(II) nitrate and 7.5 mmol of manganese(III) acetate in 120 ml of 1 normal hydrochloric acid is added dropwise to a solution of 0.12 mol of sodium tungstate dihydrate and 15 mmol of selenic acid in 200 ml of water. After stirring for 2 hours at room temperature, an excess of solid potassium chloride (3.0 g) is added, the precipitate is filtered off after 24 hours and washed with saturated CsCl solution. Drying under reduced pressure gives 2.4 g of a brown powder.

Example 9

Mn(III)-polyoxomolybdate, $(Na/NMe_4)_7[MnMo_9O_{32}]bH_2O$ 36.8 g of sodium molybdate dihydrate are dissolved in a mixture of 200 ml of 1 normal buffer solution (acetic acid/sodium acetate) and 100 ml of 1 normal hydrochloric acid. Firstly 1.6 g of selenous acid in 100 ml of water and then 1.98 g of potassium permanganate in 200 ml of 1 normal buffer solution (acetic acid/sodium acetate) are added dropwise to the above solution. The solution is stirred for 2 hours at 25° C. and precipitated using 60 ml of a 1 normal solution of tetramethylammonium chloride in water. The Mo/Mn ratio is 9:1, no selenium is present and there is no ESR signal. IR (KBr) 874, 895, 914, 930 cm$^{-1}$.

Example 10

Mn(III)-polyoxomolybdate, $K_7[MnMo_9O_{32}]bH_2O$

The procedure of Example 9 was repeated, but the precipitation was carried out using 60 ml of a 1 normal KCl solution in water. The Mo/Mn ratio is 9:1, no selenium is present and there is no ESR signal. IR (KBr) 874, 895, 914, 930 cm$^{-1}$.

Example 11
Mn(III)-polyoxomolybdate, $(Na/K)_7[MnMo_9O_{32}]bH_2O$ 36.8 g of sodium molybdate dihydrate are dissolved in a mixture of 200 ml of 1 normal buffer solution (acetic acid/sodium acetate) and 100 ml of 1 normal hydrochloric acid. Firstly 1.6 g of selenous acid in 100 ml of water and then 1.25 g of manganese(II) chloride tetrahydrate in 100 ml of water and 0.99 g of potassium permanganate in 100 ml of a 1 normal buffer solution (acetic acid/sodium acetate) are added dropwise to the above solution. The solution is stirred for 2 hours at 50° C., filtered and the polyanion is finally precipitated using 60 ml of a 1 normal solution of ammonium chloride in water. The Mo/Mn ratio is 9:1 and there is no ESR signal. IR (KBr) 874, 895, 914, 930 cm$^{-1}$.

Example 12
Mn(III)-polyoxomolybdate, $(Na/K)_7[MnMo_9O_{32}]bH_2O$ 36.8 g of sodium molybdate dihydrate are dissolved in a mixture of 200 ml of 1 normal buffer solution (acetic acid/sodium acetate) and 100 ml of 1 normal hydrochloric acid. Firstly 1.6 g of selenous acid in 100 ml of water and then 2.5 g of manganese(II) chloride tetrahydrate in 100 ml of water and 1.25 g of potassium permanganate in 100 ml of a 1 normal buffer solution (acetic acid/sodium acetate) are added dropwise to the above solution. The solution is stirred for 2 hours at 50° C., filtered and the polyanion is finally precipitated using 60 ml of a 1 normal solution of ammonium chloride in water. The Mo/Mn ratio is 9:1, the sample contains no selenium and there is no ESR signal. IR (kbR) 874, 895, 914, 930 cm$^{-1}$.

Example 13
$(Na/K)_{10}[Mn_3Se_2W_{18}O_{66}]bH_2O$ 50 g of sodium tungstate dihydrate are dissolved in a mixture of 200 ml of 1 normal buffer solution (acetic acid/sodium acetate) and 100 ml of 1 normal hydrochloric acid. Firstly 1.8 g of selenic acid in 100 ml of water and then 4.0 g of manganese(II) chloride tetrahydrate in 200 ml of water are added dropwise to the above solution. The solution is stirred for 2 hours at 50° C., filtered and the polyanion is finally precipitated using 60 ml of a 1 normal solution of ammonium chloride in water. The W/Mn ratio is 6:1 and selenium is present in the sample.

Example 14
$Na_8[MnW_{12}O_{40}(OH)_2]bH_2O$ 4.9 g of selenous acid are dissolved in 100 ml of water. 7.5 g of manganese(II) chloride tetrahydrate in 100 ml of water and also 50 g of sodium tungstate dihydrate dissolved in 100 ml of water, plus 220 ml of a 1 normal solution of ammonium chloride in water are added dropwise to the above solution. The solution is stirred for 24 hours at 25° C., filtered and the polyanion is precipitated using 60 ml of a 1 normal solution of ammonium chloride in water.

Example 15
$Na_6[MnW_{12}O_{40}(OH)_2]bH_2O$ 5.2 g of selenous acid are dissolved in 100 ml of water. 7.5 g of manganese(II) chloride tetrahydrate in 100 ml of water and also 50 g of sodium tungstate dihydrate dissolved in 100 ml of water, plus 220 ml of a 1 normal solution of ammonium chloride in water are added dropwise to the above solution. The solution is stirred for 24 hours at 25° C., filtered and the polyanion is precipitated using 60 ml of a 1 normal solution of ammonium chloride in water.

Example 16
50 g of $Na_2WO_4 2H_2O$ are dissolved in 200 ml of water, and 4.6 g of $BiONO_3 H_2O$, dissolved in 10 ml of concentrated nitric acid, are added slowly. While stirring, 3.0 g of $MnCl_2 4H_2O$ in 20 ml of water are added and a pH of 7 is set by addition of hydrochloric acid. The solution is heated for 20 minutes at 65–70° C. Slow evaporation of the solution at room temperature forms the intense orange product. The substance contains: 87.7% of W, 6.9% of Mn, 5.4% of Bi; IR (KBr): 946, 823, 797, 754, 666, 456 cm$^{-1}$.

Example 17

2.7 g of tellurium dioxide are dissolved in 15 ml of concentrated sodium hydroxide solution and added slowly to a solution of 50 g of sodium tungstate dihydrate in 200 ml of water. 5 g of manganese(II) chloride tetrahydrate dissolved in 30 ml of water are added dropwise. A pH of 4–5 is set by addition of 1 molar hydrochloric acid. After stirring for 40 minutes at room temperature, the reaction mixture is filtered and admixed with 3 g of trimethylammonium chloride. The tungsten:manganese ratio is 10:1. IR (KBr): 960, 826, 720, 480 cm$^{-1}$.

Example 18

The procedure of Example 17 was repeated, but precipitation was carried out using 1 g of tetramethylammonium chloride. Tungsten:manganese ratio=10:1. IR (KBr): 960, 826, 720, 480 cm$^{-1}$.

Example 19

The procedure of Example 17 was repeated, but the precipitation was carried out using an excess of tetramethylammonium chloride.

Example 20
Mn(IV)-lsopolyoxomolybdate $(NH_4)_6(MnMo_9O_{32})$

The synthesis was carried out using a method similar to Example 9, except that the precipitation was carried out using 60 ml of a 1 normal solution of ammonium chloride in water. The Mo/Mn ratio is 9:1. No Se is present. An ESR signal is present. IR (KBr) 874, 895, 914, 930 cm$^{-1}$.

We claim:

1. A catalytically active manganese-containing polyoxometallate of the formula (1) which activates peroxidic compounds and/or oxygen $$(Q)_q(Mn_pA_aX_xY_yM_mO_dZ_z(H_2O)_b)cH_2O \qquad (1)$$

where the symbols Q, A, X, Y, M, Z, q, p, a, b, x, y, m, d, z and c have the following meanings:

Q is one or more cations selected from the group consisting of H, Li, K, Na, Rb, Cs, Ca, Mg, Sr, Ba, Al, $PR^1R^2R^3R^4$, and $NR^1R^2R^3R^4$ where $R^1$, $R^2$, $R^3$ and $R^4$=H or $C_1$–$C_{20}$-alkyl, $C_5$–$C_8$cycloalkyl or aryl;

the index q is in the range from 1 to 60, and, for monovalent countercations, at the same time indicates the charge of the anionic unit;

Mn is manganese;

the index p is in the range from 0.1 to 10;

A is a heterometal and is one more transition metals from transition groups II to VIII apart from Zn,;

the index a is in the range from 0 to 10;

X is one or more elements selected from the group consisting of Ga, B, P, Si, Ge, As, F, Cl, Br and I;

the index x is in the range from 0 to 10;

Y is Sb, S, Te, Se and Bi;

the index y is in the range from 0.1 to 10;

M is one or more transition metals selected from the group consisting of Mo, W, Nb, Ta and V;

the index m is in the range from 0.5 to 60;

Z is one or more anions selected from the group consisting of $OH^-$, $F^-$, $Cl^-$, $Br^-$, $I^-$, $N_3^-$, $NO_3^-$, $ClO_4^-$, $NCS^-$, $SCN^-$, $PF_6^-$, $RSO_3^-$, $RSO_4^-$, $CF_3SO_3^-$, $BR_4^-$, $BF_4^-$, $OAc^-$, where 'R=H, $C_1$–$C_{20}$-alkyl, $C_5$–$C_8$-cycloalkyl or aryl;

the index z is in the range from 0 to 10;

the index d is the number of oxygen atoms necessary to balance the charge and b and c are numbers in the range from 0 to 50.

2. A catalytically active manganese-containing polyoxometallate of formula (1) as claimed in claim 1 wherein the index q is in the range from 1 to 40.

3. A catalytically active manganese-containing polyoxometallate of formula (1) as claimed in claim 1 wherein A is one or more transition metals selected from the group consisting of Ru, V, Ti, Zr, Cr, Fe, Co, Cu, Sn, Ni, Re and Os.

4. A process for preparing polyoxometallates of the formula (2)

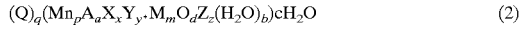  (2)

where the symbols Q, A, X, Y, M, Z, q, p, a, x, m, z, d, b, and c are as defined in claim 1 and y* is a number in the range 0–10, by reacting manganese compounds which are soluable in aqueous or organic medium with soluble compounds of the component M in the presence of compounds of the formula (3)

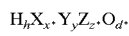  (3)

where

H is hydrogen and the index h is in the range from 0 to 8;

X is one or more elements selected from the group consisting of Ga, B, P, Si, Ge, As, F, Cl, Br and I and the index x* is in the range from 0 to 10;

Y is Sb, Se, Te or Bi and the index y is in the range from 0.1 to 10;

Z is one or more anions selected from the group consisting of $OH^-$, $F^-$, $Cl^-$, $Br^-$, $I^-$, $N_3^-$, $NO_3^-$, $ClO_4^-$, $NCS^-$, $SCN^-$, $PF_6^-$, $RSO_3^-$, $RSO_4^-$, $CF_3SO_3^-$, $BR_4^-$, $BF_4^-$, $OAc^-$, where R=H, $C_1$–$C_{20}$-alkyl, $C_5$–$C_8$-cycloalkyl or aryl and the index z* is in the range from 0 to 10 and the index d* is the number of oxygen atoms necessary to balance the charge.

5. The process as claimed in claim 4, wherein y*=0 and y>0.

6. The process as claimed in claim 4, wherein Y is Se.

7. An oxidation catalyst comprising a polyoxometallate of the formula (2) obtainable by a process as claimed in claim 4.

8. An oxidation catalyst as claimed in claim 7, which comprises one or more polyoxometallates selected from among the following compounds: $(NH_4)_{10}[Mn_3Sb_2W_{19}O_{68}]bH_2O$, $(Na/K)_{10}[Mn_3Se_2W_{18}O_{66}]bH_2O$, $Na_8[MnW_{12}O_{40}(OH)_2 6H_2O$, $Na_6[MnW_{12}O_{40}(OH)_2 6H_2O$.

9. A method for producing laundry detergents and cleaners or for delignifying paper, which method comprises using the oxidation catalyst as in claim 1.

* * * * *